Oct. 17, 1933.   L. K. SNELL   1,930,779
BRAKE
Filed July 5, 1929   2 Sheets-Sheet 2

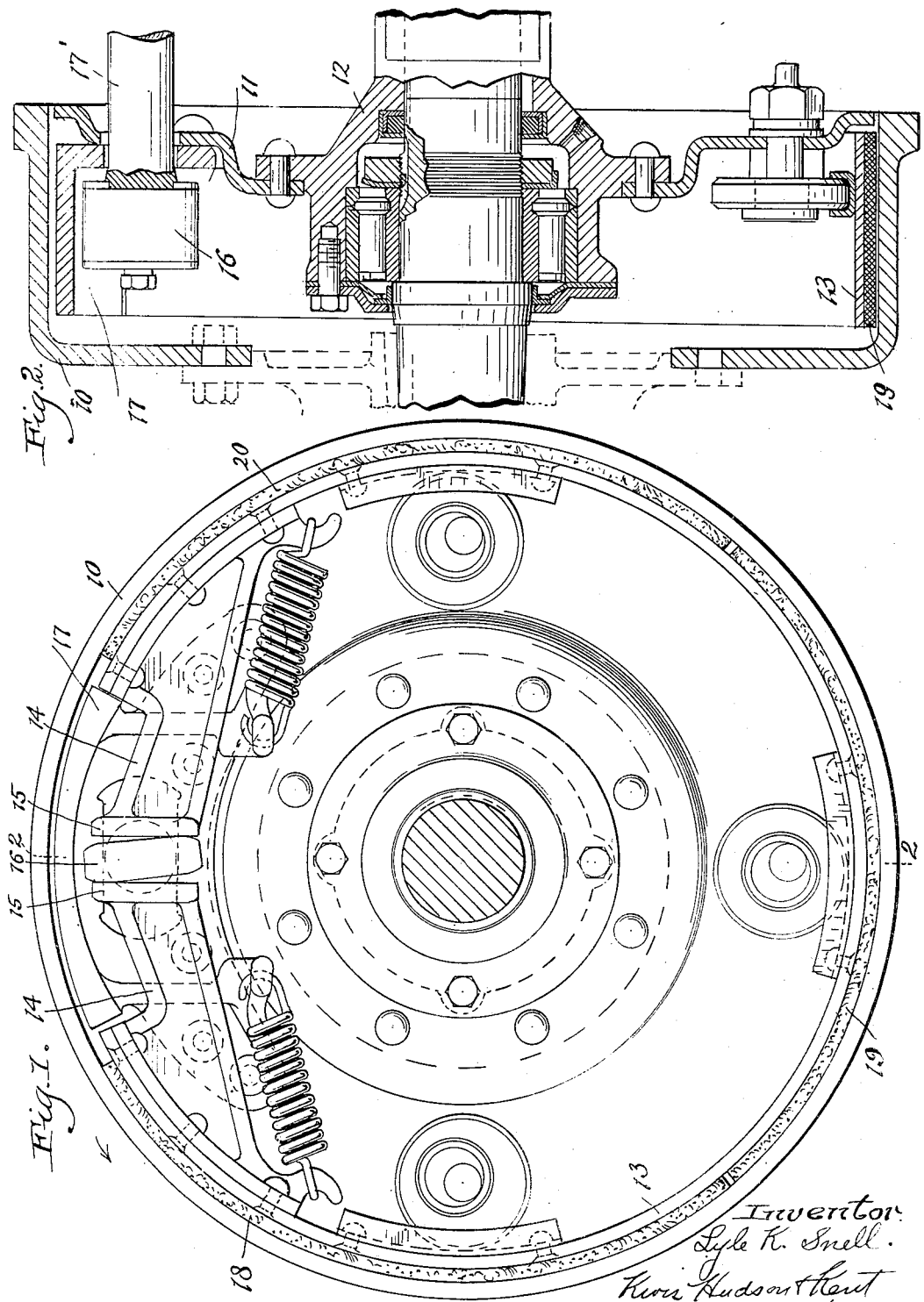

Inventor
Lyle K. Snell
Kunz Hudson & Kent
attys

Patented Oct. 17, 1933

1,930,779

UNITED STATES PATENT OFFICE 1,930,779

BRAKE

Lyle K. Snell, Detroit, Mich., assignor to Eaton Manufacturing Company, Cleveland, Ohio, a corporation of Ohio Application July 5, 1929. Serial No. 376,003

5 Claims. (Cl. 188—78)

This invention relates to vehicle brakes, and more particularly to brakes of the internal expanding type.

An object of this invention is to provide an improved form of brake in which quiet and efficient cooperation between the friction device and the brake drum is attained.

Another object of this invention is to provide an improved form of brake in which the efficiency and length of life of the friction device are increased by employing a novel form and arrangement of sections or portions of brake lining.

In the drawings forming a part of this application,

Figure 1 is a sectional elevation showing one form of my improved brake.

Fig. 2 is a section taken on line 2—2 of Fig. 1.

Figure 4:
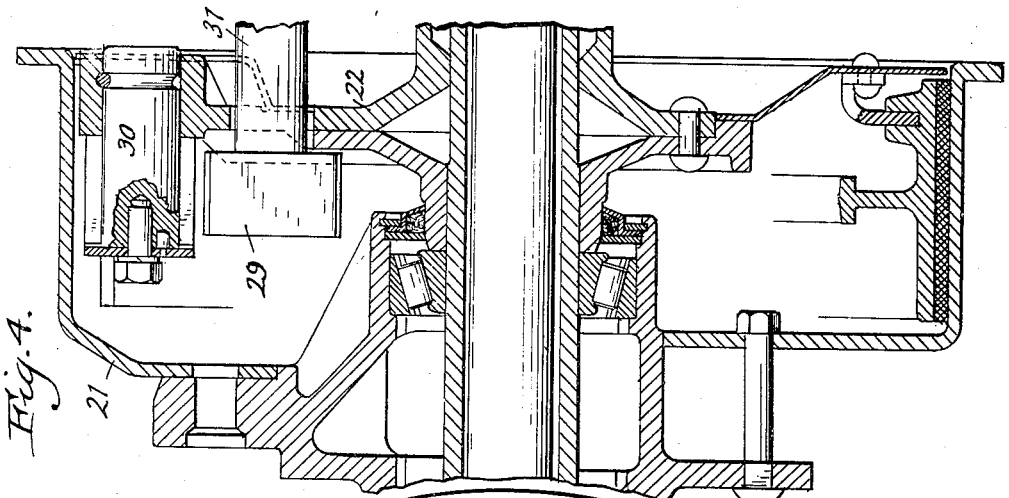
Figure 4 is a section taken on line 4—4 of Fig. 3.

As heretofore constructed, vehicle brakes have been provided with brake lining having the same surface characteristic throughout the entire length of its friction surface. The self-energizing action which takes place when the friction device is pressed against the drum causes different sections or portions of the brake lining to be pressed against the brake drum with different degrees of pressure. The different pressures which are effective at different sections of the lining cause these different sections to be heated to different temperatures, and also cause these sections to wear at different rates. In brakes, as heretofore constructed, the portions of the brake lining which are pressed against the brake drum with the heaviest pressure wear away more quickly than other portions of the lining. In addition, there is a tendency for the portions of the brake lining which are pressed most heavily against the brake drum to grab and squeak, resulting in inefficient and noisy operation.

In carrying out my invention these difficulties are overcome and quiet and efficient operation are attained by using sections of brake lining having different coefficients of friction, and in the form of brake which I have shown in Figs. 1 and 2, I employ a rotatable brake drum 10 with which is associated a stationary backing or anchor plate 11 secured to some part of the vehicle proper such as the axle housing 12. A friction device is arranged within the drum for cooperation with its inner surface. This friction device may consist of a flexible band 13 having arms 14 secured at the ends of the band. The arms 14 are provided with opposed end bearing portions 15, between which is disposed a rotatable actuating cam 16. The friction device is not rigidly attached to the backing plate, but is preferably permitted to float within the drum for a limited distance. The extent of the floating movement of the friction device is limited by the anchor member 17 which is rigidly secured to the backing plate and forms an abutment which is engaged by one or the other end of the friction device, depending upon the direction of rotation of the drum.

The band 13 of the friction device is provided with brake lining which is adapted to be pressed against the inner surface of the rotatable drum. The actuating cam is carried upon a rotatable shaft 17', and upon rotation of this shaft, the cam spreads the bearing portions of the arms apart, causing the brake lining to be pressed into frictional engagement with the surface of the drum. In carrying out my invention, this brake lining is composed of portions or sections 18, 19 and 20, each of which portions is of substantially homogeneous character as represented in the drawings. The section 18 is selected with such a surface characteristic that it will engage the drum with a high coefficient of friction. The section 20 is selected with such a surface characteristic that it will engage the surface of the drum with a low coefficient of friction. The section 19, which is between the sections 18 and 20, is selected with such a surface characteristic that it will engage the surface of the drum with a coefficient of friction having a value between the coefficients for the sections 18 and 20.

As shown in Fig. 1, the drum 10 rotates in a counter-clockwise direction when the vehicle is travelling ahead. Upon applying the brake the section 18 is pressed against the brake drum by a braking force transmitted from the actuating cam through the arm 14. Likewise, the section 20 is pressed against the brake drum by braking force transmitted through the other arm 14. The rotation of the drum, however, produces a self-energizing effect when the section 18 is pressed against its moving surface. This self-energizing effect causes the brake lining to be pressed or wedged against the drum with a progressively increasing degree of pressure. The unit pressure with which the section 19 is pressed against the drum is therefore greater than the unit pressure with which the section 18 is pressed against the drum, and likewise the unit pressure with which the section 20 is pressed against the drum is greater than the unit pressure effective upon the section 19. To achieve the most efficient results I have selected these sections of brake lining so that section 18 which is pressed against the brake drum with the lowest average unit pressure also has a surface characteristic giving the highest coefficient of friction. The section 20 which is pressed against the drum with the heaviest pressure has been selected with a surface characteristic to give the lowest coefficient of friction, and the section 19 which is pressed against the drum with an intermediate average unit pressure has been selected with a surface characteristic to give an intermedate coefficient of friction. By this arrangement of sections having different coefficients of friction, the frictional resistance between the brake drum and the brake lining will be more nearly uniform throughout the length of the braking surface of the friction device, and by approaching a more nearly uniform condition of frictional engagement between these parts, the different portions of the brake lining will wear at a more uniform rate and, furthermore, this more uniform frictional engagement will tend to cause a more uniform generation of heat thereby prolonging the life of the lining and affording smooth and efficient operation of the brake.

Figure 3:
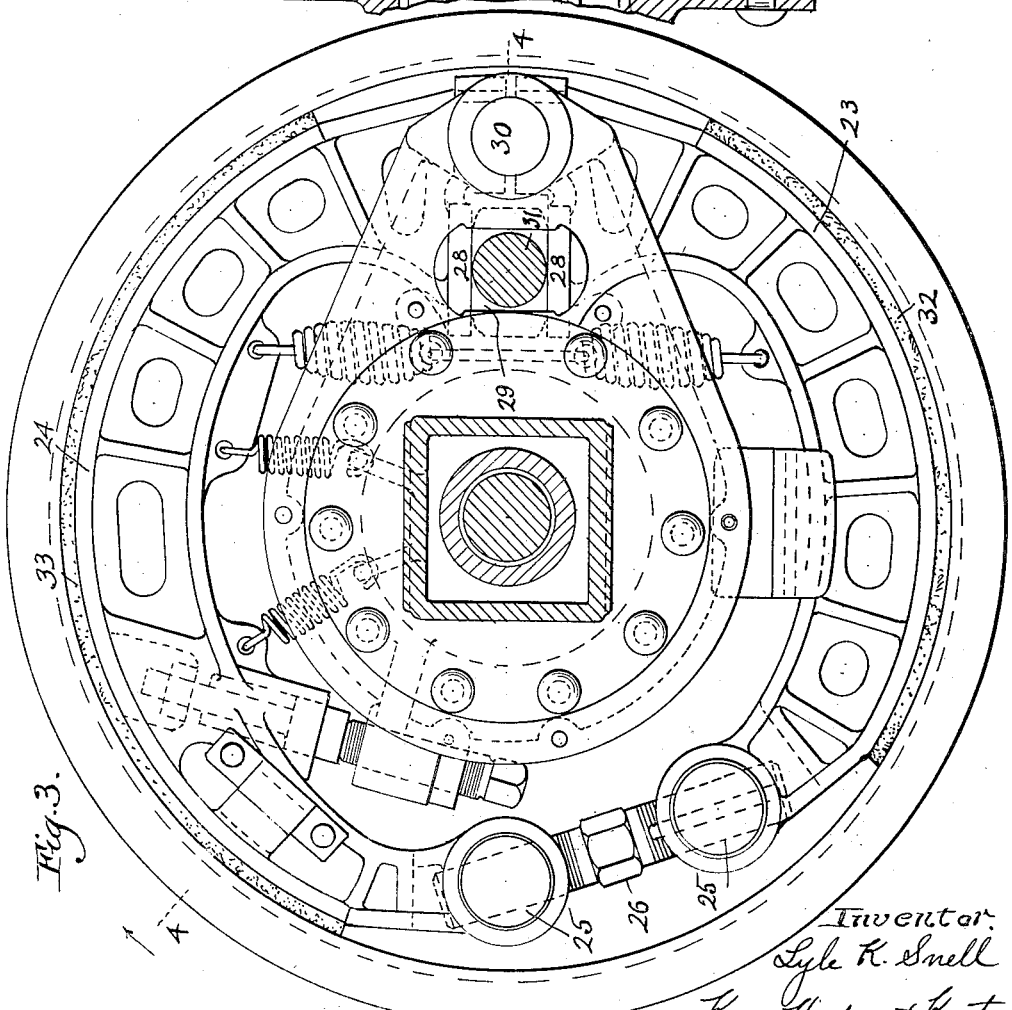
Fig. 3 is a sectional elevation showing another form of my improved brake.

In Figs. 3 and 4 of the drawings I have shown my invention applied to a brake of the multiple shoe type. In this embodiment of the invention I employ a rotatable brake drum 21 having a stationary backing plate 22 associated therewith. The friction device housed within the drum for engagement with its inner surface comprises a primary shoe 23 and a secondary shoe 24. These shoes are hinged together at one end by means of hinge pins 25 and an adjustable connecting rod 26. The opposite ends of the shoes are arranged in opposed relation, and are provided with opposed bearing portions 28 having an actuating cam 29 disposed therebetween. This friction device is not rigidly connected to the backing plate but is preferably arranged to float within the brake drum, the amount of movement of the friction device being limited by the anchor pin 30 which serves as an abutment which is engaged by one or the other of the opposed ends of the shoes, depending upon the direction of rotation of the drum when the brake is applied. The actuating cam 29 is carried on one end of an operating shaft 31 and upon rotation of this shaft wedges the opposed ends of the shoes apart so as to press the brake linings 32 and 33, carried by the shoes 23 and 24, respectively, against the surface of the brake drum. As represented in the drawings each of these lining portions is substantially homogeneous in character. With the drum moving in a clockwise direction, as shown in Fig. 3, rotation of the actuating cam 29 causes the lining of the primary shoe to be pressed against the brake drum. The frictional engagement between the lining of the primary shoe and the drum tends to carry the shoe around with the drum, and produces a self-energizing effect which causes the brake lining of the secondary shoe to be heavily pressed against the moving drum.

In carrying out my invention the brake lining for the primary shoe is selected with such a surface characteristic that it will engage the surface of the drum with a high coefficient of friction, while the lining of the secondary shoe is selected with such a surface characteristic that it will engage the surface of the drum with a low coefficient of friction. By selecting the sections of brake lining in this manner, the shoe which is most heavily pressed against the brake drum will have brake lining thereon having a low coefficient of friction, and the shoe which is more lightly pressed against the drum will have brake lining thereon with a high coefficient of friction. By selecting the brake linings in this manner the different sections of lining will wear at a more uniform rate and likewise, the temperatures generated by the frictional engagement between the drum and the sections of lining will be more uniform with the result that there will be less tendency to squeak and chatter.

While I have shown a brake lining composed of three portions or sections in Fig. 1, and of two sections in Fig. 3, obviously any desired number of such portions or sections could be employed and likewise, while I have shown in Fig. 3 a brake having only two shoes, it should be understood that my invention is equally applicable to various forms of multiple shoe brakes.

While I have shown and described my invention in a detailed manner, it should be understood, however, that I do not limit my invention to the precise details shown and described, but regard it as including such modifications and changes as do not involve a departure from the spirit of the invention and the scope of the appended claims.

Having described my invention, I claim:

1. In a brake the combination of a drum, a friction device having a plurality of drum engaging surfaces, and means for actuating said device whereby said surfaces engage said drum with different pressures, said surfaces being formed to engage said drum with coefficients of friction varying in inverse relation to said different pressures.

2. In a brake the combination of a drum, a friction device provided with a plurality of surface portions adapted to engage said drum, and means for actuating said device whereby said surface portions are pressed against said drum with progressively varying pressure values, the characteristics of said surface portions being such that they engage said drum with coefficients of friction which vary in inverse relation with said varying pressure values.

3. In a brake the combination of a drum, a friction device associated with said drum including primary and secondary shoes arranged for cooperation with the same surface portion of the drum, the coefficient of friction between the primary shoe and the surface portion of the drum being higher than the coefficient of friction between the secondary shoe and the surface portion of the drum.

4. In a brake the combination of a drum, a friction device associated with said drum including primary and secondary shoes arranged for cooperation with the same surface portion of the drum, friction lining on each of said shoes for contact with said surface portion, and means for actuating said shoes whereby the lining of the primary shoe is pressed against said surface portion with a relatively low unit pressure and the lining of the secondary shoe is pressed against said surface portion with a relatively high unit pressure, the friction lining of said shoes being such that the coefficient of friction between the friction lining of said primary shoe and said surface portion is relatively high and the coefficient of friction between the friction lining of said secondary shoe and said surface portion is relatively low.

5. In a brake the combination of a drum, a friction device for cooperation with said drum and including friction lining having a plurality of portions arranged in a series to extend circumferentially of said drum, and means for causing said lining to frictionally engage said drum whereby one portion of said series is pressed against the drum with a relatively low unit pressure and another portion of the series is pressed against the drum with a relatively high unit pressure, each of the portions of the circumferentially extending series being substantially homogeneous in character and said portions being so formed that the portion of said series which is pressed against the drum with a relatively low unit pressure has a relatively high coefficient of friction and the portion of said series which is pressed against the drum with a relatively high unit pressure has a relatively low coefficient of friction.

LYLE K. SNELL.